United States Patent [19]

Kobelt

[11] 4,164,993
[45] Aug. 21, 1979

[54] AIR COOLED BRAKE DISC

[76] Inventor: Jacob Kobelt, 6110 Oak St., Vancouver, British Columbia, Canada, V6M 2W2

[21] Appl. No.: 879,888

[22] Filed: Feb. 21, 1978

[51] Int. Cl.$^2$ .................... F16D 65/12; F16D 65/847
[52] U.S. Cl. .................... 188/218 XL; 188/264 AA
[58] Field of Search ........ 188/71.6, 218 XL, 264 AA, 188/264 P; 192/107 R

[56] References Cited

U.S. PATENT DOCUMENTS

| | | | |
|---|---|---|---|
| 2,048,420 | 7/1940 | Babel | 188/218 XL |
| 2,215,420 | 9/1940 | Eksergian | 188/218 XL |
| 2,215,421 | 9/1940 | Eksergian | 188/218 XL |
| 2,369,328 | 2/1945 | Watts | 188/218 XL X |
| 2,775,322 | 12/1956 | Bachman | 188/218 XL |

*Primary Examiner*—Duane A. Reger

*Attorney, Agent, or Firm*—Carver and Company

[57] ABSTRACT

Air cooled brake disc having first and second disc-shaped face portions with each face portion having an outer braking surface and an inner surface. A plurality of radially disposed webs extend between the face portions from an inlet adjacent an inner portion of the disc to an outer portion of the disc, the webs defining with inner surfaces of the face portions radially extending cooling passages within the disc. A plurality of radially disposed cooling fins extend from opposite inner surfaces of each passage. Sums of cross sectional areas of inner and outer cooling passage portions defined in part by the cooling fins are generally equal to reduce air flow velocity variations within the cooling passages. In one embodiment, a clearance space extends between opposed edges of the fins adjacent a central diametrical plane of the disc.

10 Claims, 12 Drawing Figures

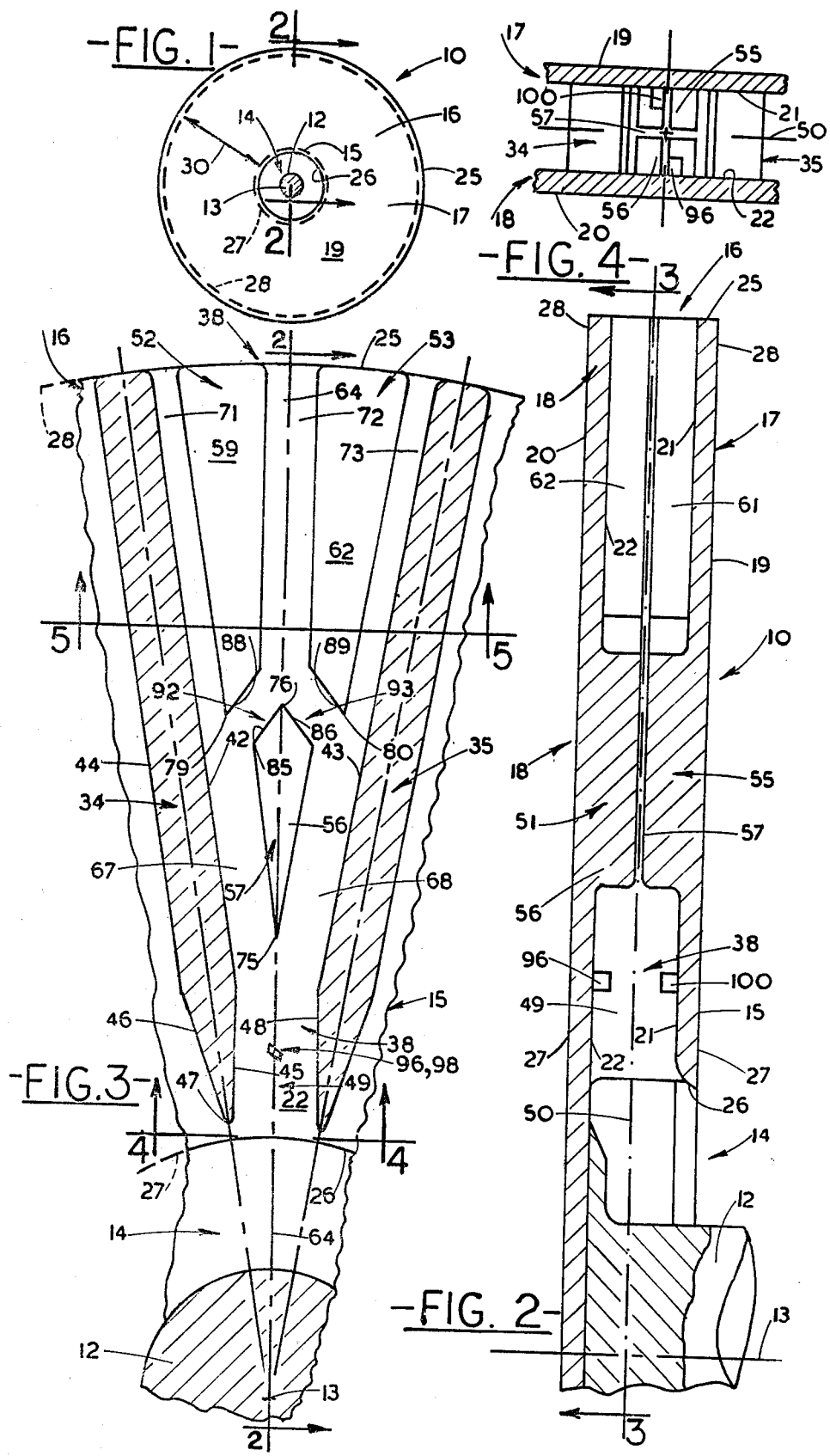

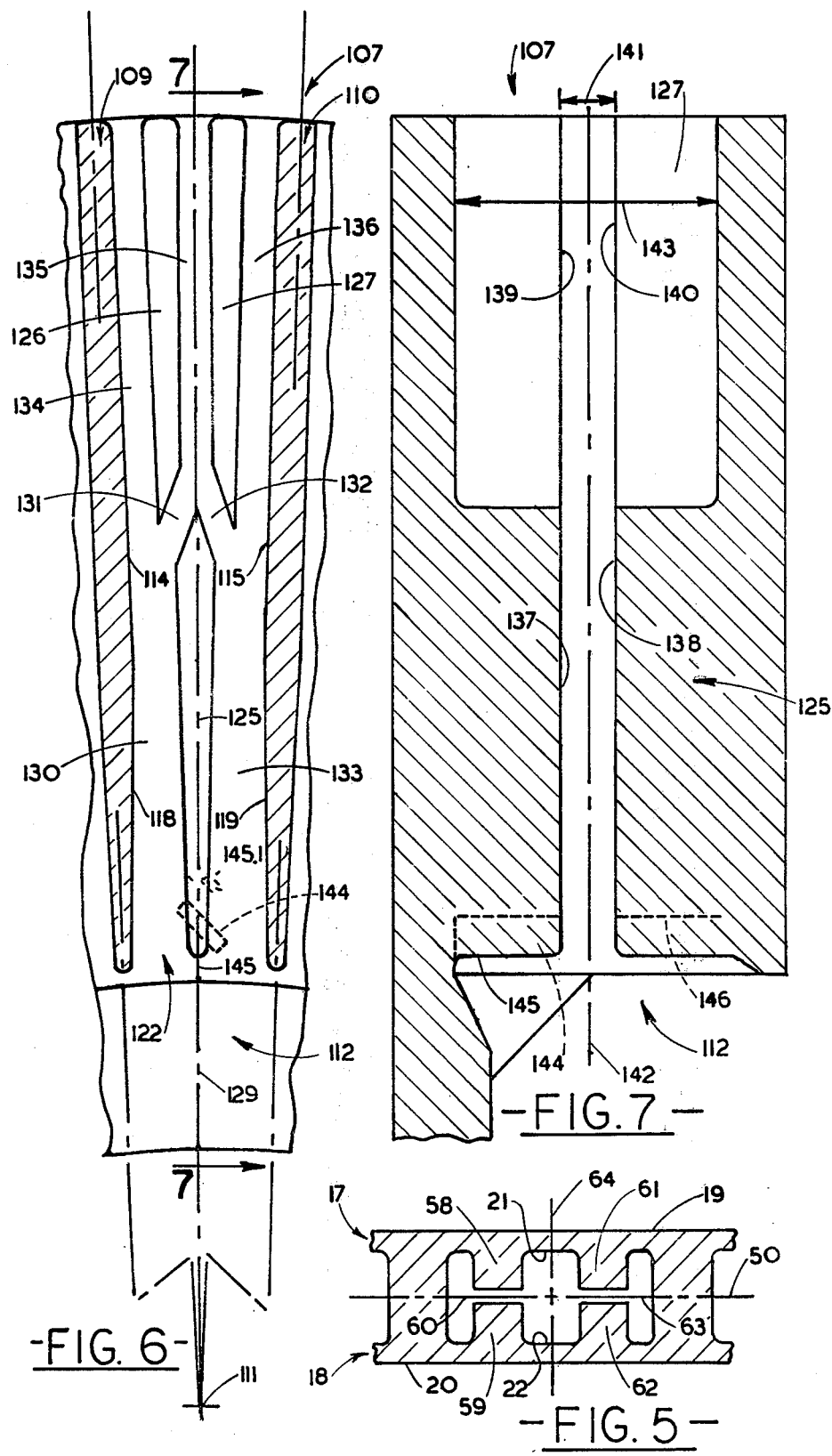

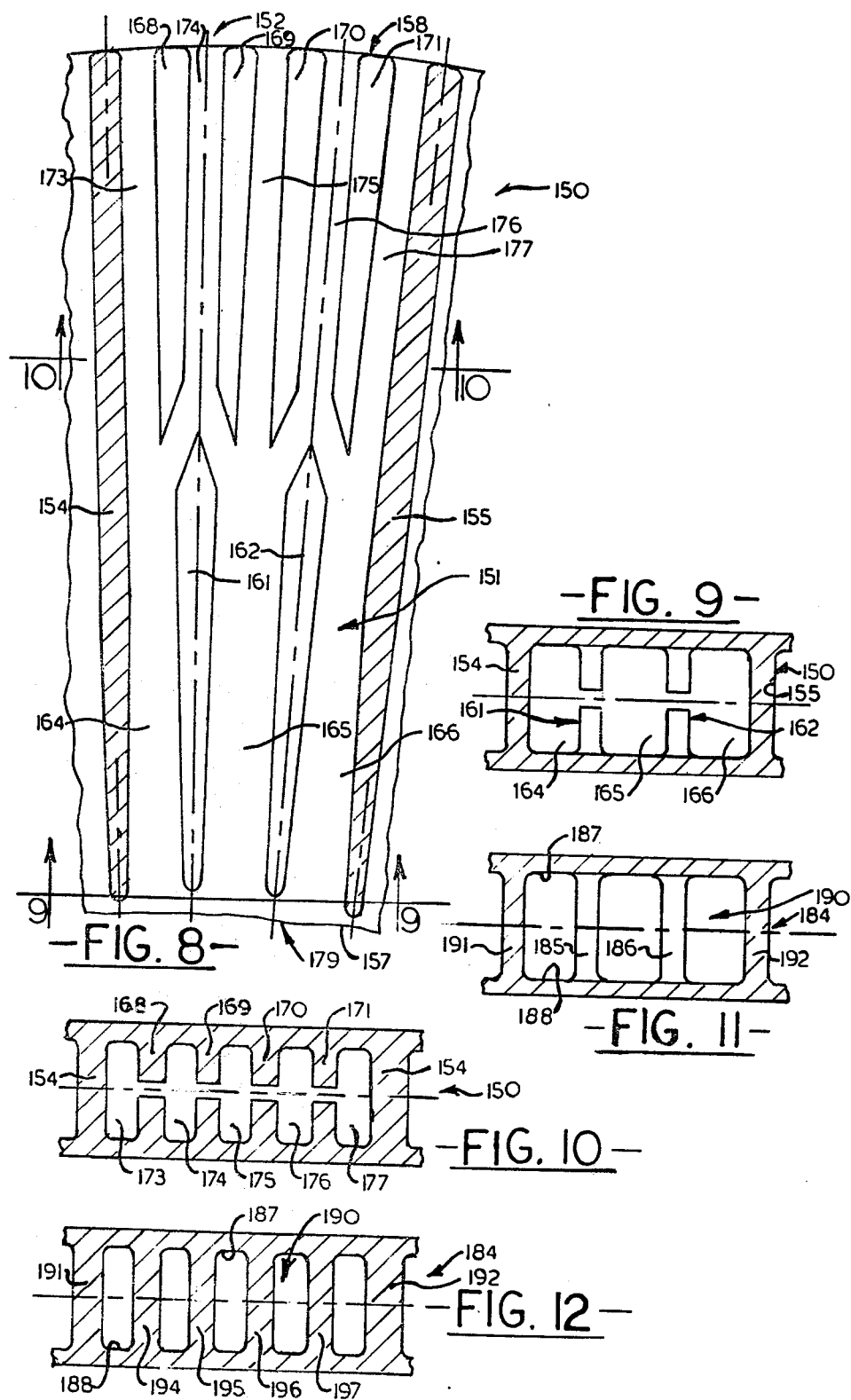

ered on this page.

AIR COOLED BRAKE DISC

BACKGROUND OF THE INVENTION

1. Field of the Invention

The invention relates to an air cooled brake disc particularly for heavy industrial usage for absorbing relatively short but heavy inputs of energy, or continuous lighter input of energy, whilst maintaining relatively balanced disc temperatures to reduce thermal stresses.

2. Prior Art

Prior art air cooled brake discs usually have a plurality of generally radially disposed, straight cooling passages extending from an inlet opening adjacent the brake shaft to outlets adjacent the periphery of the disc. Such discs are termed "hollow discs" and are commonly cast structures, and thus the design of the cooling structure, ie. passage shape, etc., is dictated to some extent by the method of manufacture as well as thermal stress problems resulting from brake application. Some hollow air cooled brake discs are designed for essentially continuous light braking or intermittent heavier braking with little time for cooling between brake applications. In this type of disc, heat generated by braking is removed by air flowing through the cooling passages and from surrounding air contacting the outer surfaces of the disc.

In some applications discs without air cooling passages, termed "solid discs", are used. In solid discs it is mainly thermal capacity of the material in the disc that is used to absorb the heat generated by braking, that is the mass of disc material is used as a heat sink with minimal removal of heat by air cooling during the application of the brake. Solid brake discs as above are commonly used in applications where the brake is engaged heavily for a relatively short time, and is then disengaged for a relatively long period during which the brake cools in surrounding air where heat from the material in the disc is conducted outwards to outer surfaces where the heat radiates or is lost by convection. This contrasts with removal of heat by intimate contact of a flow of cooling air with large surface areas of the cooling passages in the hollow disc, and for heavy duty applications requiring large discs, mass of the disc becomes unpractical and thermal stresses generated can cause cracking or warping of the disc.

SUMMARY OF THE INVENTION

The present invention reduces some of the difficulties and disadvantages of the prior art by providing within one general disc design, means to effect removal of heat by internal air cooling passages within the disc and also absorption of heat in heat sinks within the disc, and thus combines the advantages of both types of brake disc as above. Furthermore, means to induce vortices within the disc are provided to improve heat transfer between surfaces of the passages and fins and the air flowing through the passages.

An air cooled brake disc according to the invention has first and second disc-shaped face portions. Each face portion has an outer braking surface and an inner surface, at least one face portion having cooling air inlet means adjacent an inner portion of the disc. A plurality of radially disposed webs extend between the face portions from the inner portion of the disc to an outer portion of the disc, the webs defining with inner surfaces of the face portions a plurality of radially extending cooling passages within the disc. The disc is further characterized by a plurality of radially disposed cooling fins extending from opposite inner surfaces of each passage.

A detailed disclosure following, related to the drawings, describes preferred embodiments of the invention which is capable of expression in structure other than that particularly described and illustrated.

DESCRIPTION OF THE DRAWINGS

FIG. 1 is a fragmented front elevation of a brake disc according to the invention viewed along a shaft mounting the disc, FIG. 2 is a simplified fragmented section on a radius of a portion of a disc generally on line 2—2 of FIG. 1 and also seen from line 2—2 of FIG. 3, FIG. 3 is a simplified fragmented section on line 3—3 of FIG. 2, FIG. 4 is a simplified fragmented section generally on line 4—4 of FIG. 3, FIG. 5 is a simplified fragmented section generally on line 5—5 of FIG. 3, FIG. 6 is a simplified fragmented section in a diametrical plane of a portion of a first alternative disc, FIG. 7 is a simplified fragmented section on line 7—7 of FIG. 6, FIG. 8 is a simplified fragmented section in a diametrical plane of a portion of a section alternative disc, FIG. 9 is a simplified fragmented section on line 9—9 of FIG. 8, FIG. 10 is a simplified fragmented section on line 10—10 of FIG. 8, FIG. 11 is a simplified fragmented section of a third alternative disc generally similar to the second alternative disc of FIG. 8 and as would be seen from line 9—9 of FIG. 8, FIG. 12 is a simplified fragmented section of the third alternative disc as would be seen from line 10—10 of FIG.. 8.

DETAILED DISCLOSURE

FIGS. 1 and 2

A brake disc 10 according to the invention is mounted on a shaft 12 journalled for rotation about a shaft axis 13 in bearings, not shown, the disc having a cooling air inlet 14, namely an annular passage surrounding the shaft 12 adjacent an inner portion 15 of the disc. The disc has an outer portion 16, and first and second spaced apart disc-shaped face portions 17 and 18, the face portions 17 and 18 having outer braking surfaces 19 and 20 and inner surfaces 21 and 22 respectively. The first face portion 17 has an outer periphery 25 and an inner periphery 26 defining in part the annular passage of the air inlet 14. A pair of brake pads mounted in calipers, not shown, sweep the disc over similar areas on each face portion defined by inner and outer limits 27 and 28 which define limits of swept portions 30 of the disc.

FIGS. 2 through 5

The disc has a plurality of similar radially disposed webs, two of which are shown and are designated 34 and 35, the webs extending peripherally between the face portions 17 and 18 from the inner portion of the disc 15 to the outer portion 16. The webs define a plurality of similar radially extending cooling passages within the disc, one of the passages being designated generally 38.

The cooling passage 38 is defined by oppositely disposed side walls 42 and 43 of the webs 34 and 35 respectively and oppositely disposed portions of the inner surfaces 21 and 22 of the face portions. From FIGS. 4 and 5, it can be seen that the passage 38 is generally rectangular in cross section with sufficient radii or fillets extending between the webs and inner surfaces of the face portions to reduce thermal and dynamic stresses. Thus the webs define with inner surfaces of the face portions radially extending cooling passages within the disc. Adjacent the outer portion 16 of the disc, the web 34 has parallel side walls 42 and 44, and adjacent the inner portion 15 of the disc the web 34 has side walls 45 and 46 which taper inwardly a relatively small amount generally towards a central portion of the disc to merge smoothly over an inner end 47 of the web. Adjacent the inner portion 15 of the disc the web 35 has a side wall 48 disposed oppositely to the side wall 45 of the web 34. The oppositely disposed side walls 45 and 48 of adjacent webs taper inwardly adjacent the inner portion of the disc so as to be parallel to each other and define an entrance portion 49 of the cooling passage having parallel side walls. The parallel side walls are preferred to provide an entrance portion of constant cross sectional area for entry of air into the passage with minimal speed or pressure changes. Note that the webs extending between side face portions of the disc are of constant cross sectional area apart from the tapered inner portion adjacent the entrance of the passage, and thus thermal stresses induced by the webs are less than would occur with an inwardly tapering web having a relatively thick wall adjacent the outer portion of the disc.

The disc is generally symmetrical about a central diametrical plane 50 spaced equally between the outer braking surfaces 19 and 20. The cooling passage 38 has first, second and third cooling fin pairs 51, 52 and 53, the first fin pair 51 being adjacent the inner portion 15 of the disc and the second and third fin pairs being adjacent the outer portion 16 of the disc. As seen best in FIGS. 2, 4 and 5, the first fin pair has similar first fins 55 and 56 extending inwardly from the first and second face portions 17 and 18 respectively, the second fin pair 52 has similar second fins 58 and 59 similarly extending inwardly from the face portions 17 and 18 of the disc respectively, and the third fin pair has similar third fins 61 and 62 extending from the first and second face portions 17 and 18. The fins of a particular pair on one side of the passage are aligned with each other. The fins extend normally from the inner surfaces of the respective face portions so that each fin pair is disposed symmetrically about a generally radially disposed plane.

As seen in FIGS. 2 and 4, a clearance space 57 extends between opposed edges of the first fins 55 and 56 adjacent the central diametrical plane 50, the clearance space being typically between 1.0 millimeter and 15 millimeters for a disc of between 2 and 10 cms. overall thickness. The clearance spaces permit the two opposed fins of a fin pair to move independently during expansion and contraction of the disc so as to reduce thermal stresses and also to permit cooling air to flow between the fins to increase transfer of heat from the fins to the cooling air. As seen in FIG. 5, similar clearance spaces 60 and 63 extend between opposed edges of the second fins 58 and 59 and the third fins 61 and 62 respectively and act similarly to the clearance space 57 between the first fins. Thus it can be seen that the plurality of radially disposed cooling fins extend from opposite inner surfaces of each passage towards respective edges spaced closely to the diametrical plane of the disc. Separate fins of a fin pair are preferred for the reasons above, however, as described with reference to FIGS. 11 and 12, in some applications a fin extending continuously between the inner surfaces of the face portions is acceptable.

As best seen in FIG. 3, the second and third fins 59 and 62 peripherally displaced peripherally from each other and disposed symmetrically on opposite sides of a radial plane 64 passing through the first fin. The first fin pair divides an inner portion of the passage 38 into first and second inner passage portions 67 and 68, and the second and third fin pairs 52 and 53 divide an outer portion of the passage 38 into first, second and third outer passage portions 71, 72 and 73.

As best seen in FIG. 3, the first fin 56 has leading and trailing ends 75 and 76 respectively tapered to knife edges to promote relatively smooth air flow around the fin with minimal restriction. The second and third fins 59 and 62 have chisel-shaped leading ends 79 and 80, respectively, and thus the leading ends 75, 79 and 80 are tapered to divide air flow smoothly. The trailing end 76 of the first fin has a pair of symmetrically inclined rear faces 85 and 86 which define a V-point pointing outwardly from the shaft axis 13. The leading ends 79 and 80 of the second and third fins have symmetrically inclined leading faces 88 and 89 which are generally parallel to the oppositely disposed rear faces 85 and 86 of the end 76 so as to define parallel sided clearance passages 92 and 93 between the first and second, and the first and third fins respectively. The remaining first, second and third fins 55, 58 and 61 of the first, second and third fin pairs are similar and thus it can be seen that clearance is provided between trailing ends of the first fin pair and adjacent leading ends of the second and third fin pairs to permit passage of air between the inner and outer passage portions. Thus the cooling fins are discontinuous along radii of the disc, ie. separated from each other which is necessary for air to flow between the fins to additional passages formed when the inner fin pair effectively divides into two or more outer fin pairs.

Referring to FIG. 3, the first and second inner passage portions 67 and 68 have approximately equal cross sectional areas, and the first and third outer passage portions 71 and 73 have equal cross sectional areas, with the second outer passage portion 72 being somewhat larger in area. The dimensions are such that the first and second inner passage portions have a total cross sectional area which is approximately equal to total cross sectional area of the first, second and third outer passage portions. Thus the cooling passage 38 has a generally equal cross sectional area from the portion 49 to an exit adjacent the outer portion 16 of the disc, thus reducing air velocity variations along the passage. Preferably the webs and the first, second and third fin pairs have fillet radii which blend smoothly into the inner surfaces 21 and 22 to reduce thermal stress concentration and friction losses relating to air flowing through the passages.

For some applications, to induce turbulence into air flow in the passage a vortex generator 96 is provided adjacent the entrance portion 49 of the cooling passage. The vortex generator 96 is an obliquely inclined fin-like member 98 extending inwardly towards the diametrical plane 50 from the inner surface 22 of the passage and is located upstream of the leading end 75 of the first fin 51 and adjacent the radial plane 64. As seen only in FIG. 4, a similar vortex generator 100 is provided on the opposite inner surface 21 of the cooling passage and is similarly upstream of the leading end of the first fin 55 and on an opposite side of the passage 38. The vortex generators are inclined in opposite directions to radii of the disc so as to induce vortices in the air flow rotating in the same direction through the passage. The vortex generators thus reinforce each other to induce a spiral flow in the passage and are considered to be particularly important at low speeds where air flow through the passage is likely to be laminar. As is well known, for cooling applications laminar flow is less effective than turbulent flow, and thus the vortex generators generate turbulence to improve heat transfer to the air flowing in the passage. While the vortex generator is shown to be the fin-like projection 98 extending to a position about 10% of passage height, ie. about 20% of cooling fin height, other types of vortex generators can be substituted. However, it is preferred that the vortex generator is a projection having a surface inclined to the radius of the disc at that location, and should interact with the air flow sufficiently only to generate vortices and yet reduce air velocity minimally.

One cooling passage 38 only has been described and the disc has a plurality of similar passages spaced equally through the disc and a circumferential pitch determined by the angle between the webs 34 and 35.

OPERATION

The disc brake is operated in a normal manner for an air cooled disc brake but, in the present design, greater flexibility in the design is possible by varying the size and number of cooling fins within the cooling passages. Air flow through each passage is divided by the first fin adjacent the entrance of the cooling passage into two separate streams in the inner passage portions 67 and 68, and is then divided again and partially recombined by the second and third fins to form three separate streams of cooling air in the outer passage portions 71, 72 and 73. It can be seen that a portion of the air from the two inner passage portions passes through the second outer passage portion 72 between the second and third cooling fins, the remainder of the air passing outwardly through the first and third outer passage portions 71 and 73. As air flows radially outwards through the disc it becomes heated and thus less effective as a cooling medium. Thus the additional cooling area adjacent the outer portion of the disc provided by the additional fins is advantageous in compensating, to some extent, for the loss of cooling effectiveness of the air and thus disc temperatures are more evenly distributed.

ALTERNATIVES AND EQUIVALENTS

If the brake is for isolated, short-period, heavy duty applications where the air cooling has little opportunity to remove heat from the disc during braking, the heat is absorbed primarily in the disc which thus serves more as a heat sink or solid disc than a cooled disc, and the cooling fins can be thickened in cross section to enlarged areas. In this application where the disc is primarily designed for heat absorption and not rapid air cooling, the fins are thickened to serve as heat sinks with little attempt to increase surface area for cooling purposes as efficient continuous cooling is not required. After a heavy braking application, the disc is rotated without braking and air cooling can be relatively slow as it is expected there would not be heavy braking for some time. Thus in discontinuous but heavy braking applications, heat capacity of the disc can be increased by thickening the cooling fins which can be easily effected and the sum of cross sectional areas of inner and outer cooling passage portions can be maintained equal, thus reducing air velocity variations along the cooling passages.

The disc 10 of FIGS. 1 through 5 is a disc having a relatively large swept area, that is ratio of swept radial length to the disc outer radius is about 75% and thus represents a relatively compact disc. Angular spacing between adjacent webs defining the cooling passages is approximately 20 degrees, and thus there is a relatively small number of air cooling passages within the disc. The webs diverge relatively steeply and thus the fins have relatively obliquely inclined side walls which tend to exaggerate diverging side walls of the cooling fins and to increase volume of fins acting as heat sinks within the passages. If the fins or heat sinks are extended to the broken outlines 56.1, 59.1 and 62.1, the disc 10 would tend to represent an extreme limit of design of a disc for intermittent heavy brake applications where heat is dissipated into heat sinks during the brake application and is then removed by air cooling after the brake is released, the amount of air cooling during brake application being relatively small.

FIGS. 6 and 7

A second alternative brake disc 107 is designed for essentially continuous brake operation and thus relies on effective air cooling during brake operation and thus heat sinks effects of the cooling fins are relatively small. The brake disc 107 has a ratio of swept radial length to outer disc radius of about 20% and has adjacent webs 109 and 110 spaced peripherally at about 4 degrees pitch which results in almost parallel webs defining a cooling passage 112. Oppositely disposed side walls 114 and 115 of the webs 109 and 110 respectively adjacent an outer portion of the passage 112 are thus almost parallel, and oppositely disposed side wall portions 118 and 119 of the webs 109 and 110 adjacent an inner portion of the passage are inclined to radii so as to be parallel so as to provide an entrance portion 122 for the passage 112 of essentially constant cross sectional area.

The cooling passage 112 has first, second and third cooling fin pairs 125, 126 and 127, the first fin pair being adjacent an inner portion of the disc and the second and third fin pairs being adjacent the outer portion of the disc. The second and third fin pairs are displaced peripherally from each other and disposed symmetrically on opposite sides of a radial plane 129 passing through the first fin pair. Clearance passages 131 and 132 are provided between trailing ends of the first fin pair and adjacent leading ends of the second and third fin pairs to permit air to flow between the inner and outer passage portions as in the previously described embodiment. It can be seen that the first fin pair 125 divides the inner portion of the passage 122 into two inner passage portions 130 and 133 of equal cross sectional area, and the second and third fin pairs 126 and 127 divide an outer portion of the cooling passage into three outer passage portions 134, 135 and 136 of generally equal cross sectional area. Note that a portion of the passage adjacent the outer portion of the disc is divided into three generally equally sized outer passage portions between the fin pairs 126 and 127 because the webs 109 and 110 and the fin pairs 126 and 127 are of approximately equal thickness and thus equal passage widths are appropriate. This contrasts with the embodiment of FIGS. 1 through 5 in which the second and third cooling fin pairs 52 and 53 are considerably thicker than the webs 34 and 35, and for more effective cooling the second outer passage portion 72 is wider than the first and third outer passage portions 71 and 73.

Note that an aspect of importance is that the sum of cross sectional areas of the inner passage portions equals the sum of cross sectional areas of the outer passage portions thus providing a plurality of cooling passages between the fins and webs of essentially constant cross sectional area. As best seen in FIG. 7, the cooling fin pairs 125 and 127 have opposed outer edges 137 and 138, and 139 and 140 respectively which are spaced apart at a spacing 141 which represents about 20% of passage height 143 which permits greater flow of cooling air over opposite edges of the fins than in the embodiment of FIGS. 1 through 5. The fins have tapered leading ends, an end of the fin pair 125 only being designated 145.

A vortex generator 144 can be provided and is shown in broken outline upstream of an alternative leading end 145.1 of the first fin pair, also shown in broken outline. Note that if a vortex generator is provided, the fin pair 125 is reduced in length by having the alternative leading end 145.1 disposed radially outwards of the end 145. The vortex generator 144 is disposed at an opposite angle to a second vortex generator 146 disposed upstream of a leading end of the opposite fin of the first fin pair.

Thus it can be seen that there is a considerable variation in design of cooling fins and webs, depending on the ratio of swept radial length to disc outer radius, and angular pitch of webs within the disc. Desired wall thicknesses of face portions of the disc can be made thicker or thinner depending on heat sink and air cooling requirements and other variations within the concept of the invention are envisaged as follows.

FIGS. 8 through 10

In a third alternative brake disc 150 where continuous, relatively light air cooling is required, surface area for heat transfer is further increased from the FIG. 6 embodiment by increasing the number of cooling fins within each cooling passage. Alternatively, more cooling passages containing narrower fins can be provided but this is not illustrated. Thus, in the third alternative embodiment 150 a typical cooling passage 152 is defined by two webs 154 and 155 extending between inner and outer portions 157 and 158 of the disc. The inner portion 157 of the disc has two inner cooling fin pairs 161 and 162 which divide the passage 152 into three inner passage portions 164, 165 and 166. The outer portion 158 of the disc has four outer cooling fin pairs 168 through 171 which divide the passage 152 into five outer passage portions 173 through 177. Similarly to the previously described embodiments, the inner and outer passage portions each have a cross sectional area, and the sum of the cross sectional areas of the inner passage portions is approximately equal to the sum of the cross sectional areas of the outer passage portions. Also leading ends of the webs are tapered slightly to provide an entrance portion of generally constant cross sectional area to reduce air flow variations. Thus in the disc 150, two inner cooling fins adjacent the inner portion 157 divide into four outer cooling fins adjacent the outer portion of the disc. The cooling fins divide in a manner similar to that shown in FIG. 3 with air spaces between adjacent ends of the fins.

Vortex generators, not shown, can be provided to induce vortices in the air flow adjacent the entrance of each of the cooling passages, at least one vortex generator being provided at the entrance portion spaced upstream from each inner fin. Thus, if two fins are fitted between the web at the entrance of the cooling passage, preferably a vortex generator is provided upstream of each fin on both sides of the passage to generate vortices.

In other alternative discs, not shown, intermediate cooling fins can be provided between the inner and outer cooling fins. Thus the cooling fins can increase from one fin at the inner portion, to two intermediate fins then to three outer fins adjacent the outer portion. Clearly additional fins can be added, but in all embodiments for efficient air cooling, cooling fin surface area increases radially outwards by increasing the number of fins.

FIGS. 11 and 12

In the previous embodiments, the fins extending from opposite sides of the cooling passages have clearance spaces between opposed outer edges adjacent the central diametrical plane. In a fourth alternative disc 184, which is generally similar to the disc 150 of FIGS. 8 through 10, in FIG. 11, inner cooling fins 185 and 186 adjacent an inner portion of the disc extend continuously between opposite inner surfaces 187 and 188 of a cooling passage 190. The cooling passage 190 is defined in part by webs 191 and 192 and is generally similar to the passage 152 of FIGS. 8 through 10 except for substitution of continuously extending cooling fins for cooling fin pairs which are separated by a clearance space. The inner cooling fins 185 and 186 thus define in part undesignated inner cooling passage portions. Similarly in FIG. 12, outer fins 194, 195, 196 and 197 extend continuously from the inner surfaces 187 and 188 of the passage 190 to define in part undesignated outer cooling passage portions which communicate with the inner portions. In the disc 184, the fins connect opposite sides of a cooling passage and thus opposite ends thereof are not independent of each other. Such fins are likely to be subjected to greater stresses during manufacture or use than independent fins, and thus may have to be thicker to withstand such stresses. Thus fins which extend continuously across the cooling passages are used only in some applications where stresses in the fins are acceptable.

Thus, in summary, it can be seen that if the disc brake is for intermittent heavy braking applications where a large amount of heat energy is to be absorbed quickly, a relatively small number of relatively thick cooling fins are provided within each cooling passage, the fins in effect acting as heat sinks to absorb heat generated by braking which is later transferred to air flowing through the passages after release of the brake. Thus in this first application, cooling fin surface area is sacrificed at the expense of large masses of metal to serve as heat sinks to absorb heat. In other applications where essentially continuous removal of relatively less heat is required surface area for cooling fins is increased by increasing the number of cooling fins within the cooling passages, and a correspondingly decrease in thickness of the fins. To be within the inventive concept, the fins increase in number from the inner portion of the disc to the outer portion of the disc so as to maintain relatively equal cross sectional areas for the inner and outer passage portions to maintain essentially constant air velocity in the passage.

I claim:

1. An air cooled brake disc having first and second disc-shaped face portions, each face portion having an outer braking surface and an inner surface, at least one face portion having cooling air inlet means adjacent an inner portion of the disc, a plurality of radially disposed webs extending between the face portions from the inner portion of the disc to an outer portion of the disc, the webs defining with inner surfaces of the face portions a plurality of radially extending cooling passages within the disc, each cooling passage having a plurality of generally radially disposed cooling fins extending from opposite inner surfaces of each cooling passage, the cooling fins being further characterized by:
 (a) at least one inner fin being adjacent an inner portion of the cooling passage to divide the cooling passage into at least two inner passage portions,
 (b) at least two outer fins being adjacent an outer portion of the passage to divide the passage into at least three outer passage portions,
 (c) the inner cooling fins being separated from the outer cooling fins to permit passage of air between the inner and outer passage portions.

2. An air cooled brake disc as claimed in claim 1 in which:
 (a) the radially disposed cooling fins extend normally from the inner surfaces of the respective face portions towards respective edges spaced closely to a central diametrical plane of the disc,
 (b) the fins on one side of a particular cooling passage are aligned with similar fins extending from an opposite side of the cooling passage, a clearance space extending between opposed edges of the fins adjacent the central diametrical plane.

3. An air cooled brake disc as claimed in claim 1 in which:
 (a) the webs adjacent the outer portion of the disc have generally parallel side walls, and adjacent the inner portion of the disc have side walls which taper inwardly generally towards a central portion of the disc so that each passage has an entrance portion having generally parallel oppositely disposed side walls.

4. An air cooled brake disc as claimed in claim 1 in which:
 (a) the inner and outer passage portions each have a cross sectional area,
 (b) the sum of the cross sectional areas of the inner passage portions is approximately equal to the sum of the cross sectional areas of the outer passage portions.

5. An air cooled brake disc as claimed in claim 1 in which:
 (a) each cooling passage has first, second and third cooling fin pairs, the fin of a particular pair on one side of the passage being aligned with a corresponding fin on an opposite side of the passage so that each pair is disposed within a generally radially disposed plane,
 (b) the first fin pairs being adjacent the inner portion of the disc,
 (c) the second and third fin pairs being adjacent the outer portion of the disc, the second and third fin pairs being displaced peripherally from each other and disposed symmetrically on opposite sides of a radial plane passing through the first fin pair,
 (d) the first fin pair dividing an inner portion of the passage into first and second inner passage portions,
 (e) the second and third fin pairs dividing an outer portion of the passage into first, second and third outer passage portions,
 (f) clearance being provided between trailing ends of the first fin pair and adjacent leading ends of the second and third fin pairs to permit passage of air between the inner and outer passage portions.

6. An air cooled brake disc as claimed in claim 5 in which:
 (a) the first and second inner passage portions have a total cross sectional area which is approximately equal to total cross sectional area of the first, second and third outer passage portions.

7. An air cooled brake disc as claimed in claim 1 in which:
 (a) the inner portions of the webs are tapered to blend with a relatively small radius so as to split air flow smoothly prior to entry into the cooling passages of the disc,
 (b) the cooling fins have leading ends tapered to divide air flow smoothly.

8. An air cooled brake disc structure as claimed in claim 1 in which:
 (a) the cooling fins extend continuously between opposite inner surfaces of each passage.

9. An air cooled brake disc as claimed in claim 1 further including:
 (a) a vortex generator is provided adjacent an inlet of each cooling passage.

10. An air cooled brake disc as claimed in claim 9 in which the vortex generators of each passage are characterized by:
 (a) a projection extending inwardly from each inner surface and being located upstream of a leading end of the fin, each projection having a surface inclined to the radius of the disc at that location.

* * * * *